United States Patent [19]

Lew

[11] Patent Number: 4,892,127

[45] Date of Patent: * Jan. 9, 1990

[54] SNOW CHAIN HAVING A NETWORK OF DIAMOND SHAPED OPENINGS

[76] Inventor: Hyok S. Lew, 7890 Oak St., Arvada, Colo. 80005

[*] Notice: The portion of the term of this patent subsequent to Jul. 25, 2006 has been disclaimed.

[21] Appl. No.: 133,744

[22] Filed: Dec. 16, 1987

Related U.S. Application Data

[63] Continuation-in-part of Ser. No. 701,345, Feb. 13, 1985.

[51] Int. Cl.⁴ .............................................. B60C 27/10
[52] U.S. Cl. .................................... 152/221; 152/239; 152/242
[58] Field of Search ............... 152/208, 213 R, 213 A, 152/216, 217, 218-223, 231, 239, 240-242, 232, 243

[56] References Cited

U.S. PATENT DOCUMENTS

| | | | |
|---|---|---|---|
| 781,318 | 1/1905 | Weed | 152/239 |
| 1,419,043 | 6/1922 | Gray | 152/213 R |
| 1,458,096 | 6/1923 | Garrett | 152/239 |
| 2,059,100 | 10/1936 | Green | 152/213 A |
| 2,086,512 | 7/1937 | Reyburn | 152/242 |
| 2,130,293 | 10/1937 | Bonforte | 152/213 R |
| 3,974,871 | 8/1976 | Müller et al. | 152/239 |
| 4,020,885 | 5/1977 | Sato | 152/239 |
| 4,304,280 | 12/1981 | Lelo | 152/241 X |

FOREIGN PATENT DOCUMENTS 7141 of 1927 Australia .............................. 152/242

Primary Examiner—Michael W. Ball
Assistant Examiner—Steven D. Maki

[57] ABSTRACT

This invention discloses a snow chain comprising at least three chains or wires arranged and connected to each other in a network providing two series of diamond-shaped openings adjacent and parallel to one another, wherein the two extremities of the first chain or wire respectively extending from the two end-most junctions between the first and second chains or wires are respectively connected to the two extremities of a first retainer cord, which first retainer cord with connectors for removably connecting the two extremities thereof is linked to the first chain or wire at each zig-zag point in a sliding arrangement. One extremity of the second chain or wire extending from one of the two end-most junctions between the first and second chains or wires includes, firstly, a connector for removably connecting that extremity to one extremity of the third chain or wire extending from one of the two endmost junctions between the second and third chains or wire and, secondly, an angled link disposed at the mid-length of that extremity that engages an angled link included in the other of the two end-most junctions between the second and third chains or wires. A second retainer cord with connector for removably connecting the two extremities thereof to one another is linked to the third chain or wire at the one extremity removably connected to the one extremity of the second chain or wire and at each zig-zag point in a sliding relationship.

18 Claims, 2 Drawing Sheets

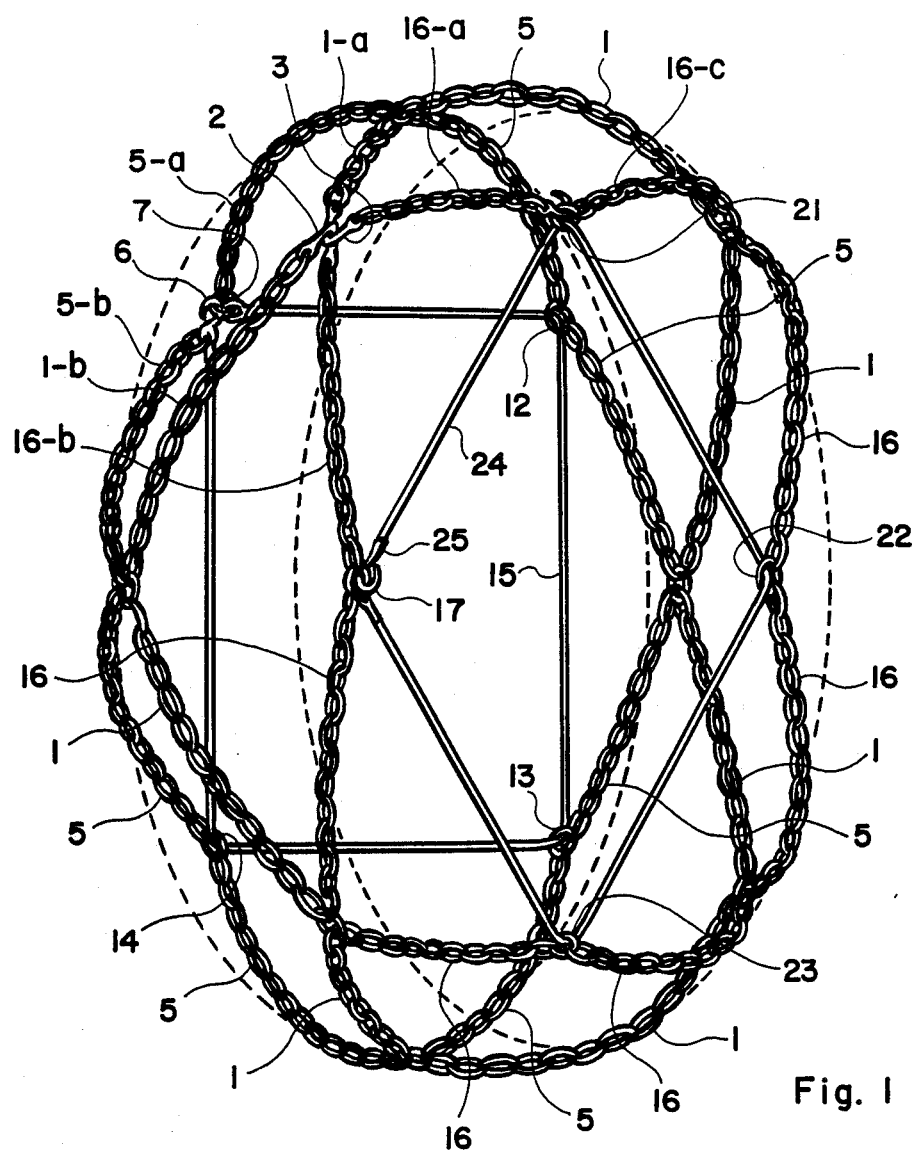
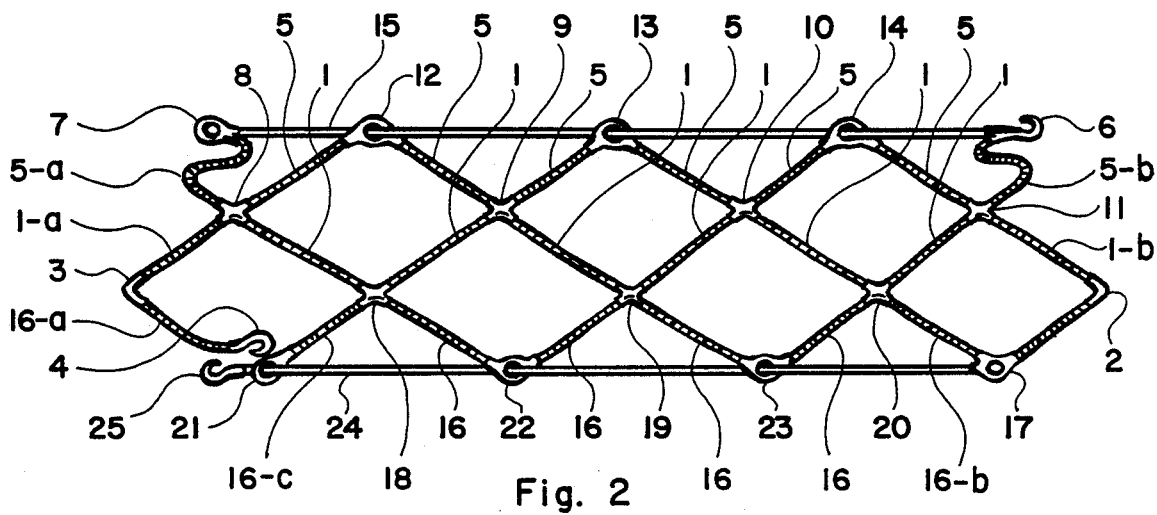
Fig. 1
Fig. 2

SNOW CHAIN HAVING A NETWORK OF DIAMOND SHAPED OPENINGS

BACKGROUND OF THE INVENTION

This application is a continuation-in-part to patent application Ser. No. 06/701,345 entitled "Continuous Snow Chain" filed on Feb. 13, 1985.

A number of years ago, the inventor of the present invention had invented a snow chain employing a continuous loop of a chain disposed in a zig-zag pattern following the tread surface of the automobile tire (U.S. Pat. No. 4,304,280), which provides truly outstanding traction and at the same time, quiet and smooth ride on all types of road surfaces including snowy, icy, and bare asphalt or concrete surfaces. The conventional snow chain employing a plurality of short chains disposed across the tread surface of the tire at regular intervals produces extremely bad noises and vibrations when the automobile is moving at a moderate or high speed, because those transversely disposed chain segments float away from the tire tread surface under the centrifugal force and around the road surface like a "flail". The continuous chain disposed in a zig-zag pattern following the tread surface of the tire in the "Continuous Snow Chain" invented by this inventor also floats away from the tread surface of the tire under the centrifugal force. However this continuous zig-zag chain does not pound the road surface, because the continuous zig-zag chain becomes continuously squeezed between the road surface and the tread surface of the tire and, consequently, there is absolutely no pounding action. The "Continuous Snow Chain" invented by the inventor of the present invention is a super snow chain as far as its performance is concerned. However, it has a serious problem as it is rather difficult to install onto the automobile tires. The continuous snow chain (U.S. Pat. No. 4,304,280) is like a bell on cat's neck. It does a wonderful job when it is somehow tied on the cat's neck. The problem is that there is no easy way to tie the bell on the cat's neck. The present invention is to teach how to tie the bell on the cat's neck. In other words, the present invention teaches how to make the Continuous snow chain from an Open loop chain and, thus, make it easy to install the continuous snow chain on and take it off from the automobile tire.

BRIEF SUMMARY OF THE INVENTION

The primary object of the present invention is to provide a closed loop continuous chain that employs an open loop construction.

Another object is to provide a novel and simple method for effectively splicing and unsplicing the traction chain disposed in a zig-zag pattern continuously following the tread surface of the tire.

A further object is to provide a snow chain that provides a super performance and cinch to install and take off.

Additional object is to provide the missing link that gives the life to the Continuous Snow Chain (U.S. Pat. No. 4,304,280) invented by this inventor nearly ten years ago.

These and other objects of the present invention will become clear as the description thereof progresses.

BRIEF DESCRIPTION OF THE FIGURES

The present invention may be described with a great clarity and specificity by referring to the following figures:

FIG. 1 illustrates a perspective view of an embodiment of the continuous snow chain of the present invention installed on an automobile tire outlined in broken lines.

FIG. 2 illustrates an embodiment of the continuous snow chain employing a pair of elongated members as means for closing the zig-zag traction cord.

DESCRIPTION OF THE ILLUSTRATED EMBODIMENTS

Figure 3:
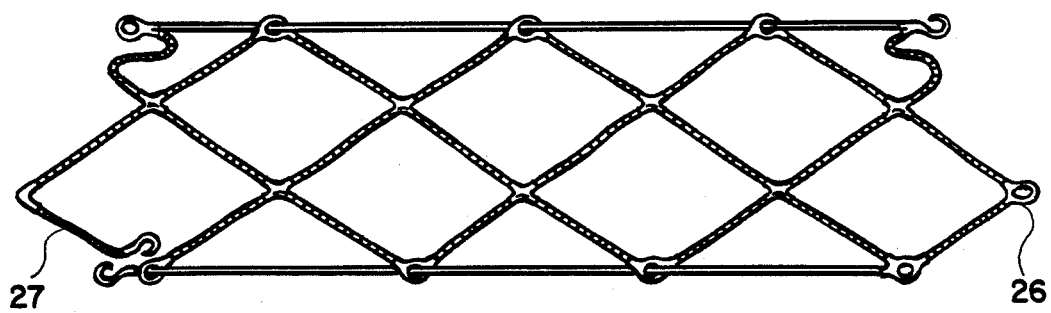
FIG. 3 illustrates an embodiment of the continuous snow chain employing the combination of an angled member and an eyelet member as means for closing the zig-zag traction cord.

In FIG. 1 there is illustrated a perspective view of an embodiment of the continuous snow chain of the present invention installed on an automobile tire outlined by broken lines. In terms of function, the continuous snow chain shown in FIG. 1 comprises a first closed loop of chain 1 disposed in a zig-zag pattern continuously following the tread surface of the tire; a second closed loop of chain 16 disposed on one side of the tire in a star-shaped pattern, wherein the outer points of the star-shaped second chain 16 are respectively connected to the group of alternate zig-zag points of the first zig-zag chain 1, while the inner points of the star-shaped second chain 16 are pulled towards each other by a first retainer cord 24 linked to those inner points in a sliding arrangement; and a third closed loop of chain 5 disposed on the other side of the tire in a star-shaped pattern, wherein the outer points of the star-shaped third chain 5 are respectively connected to the second group of alternate zig-zag points of the first zig-zag chain, while the inner points of the star-shaped third chain 5 are pulled towards each other by a second retainer cord 15 connected to those inner points in a sliding arrangement. Actually, the closed loop of the diamond-shaped network of chains comprising the zig-zag chain 1 and the pair of star-shaped chains 5 and 16 are made of an open loop of the diamond-shaped network of chains.

In FIG. 2 there is illustrated the construction of the embodiment of the continuous snow chain shown in FIG. 1. In order to show the variations in materials employed in constructing the continuous snow chain as well as for the sake of simplicity in illustration, the link chain elements of the embodiment shown in FIG. 1 are replaced with shielded wire elements in the embodiment shown in FIG. 2. Apart from the aforementioned change of the elements, the same numerals stand for the same elements in FIGS. 1 and 2. In terms of structure, the continuous snow chain shown in FIGS. 1 and 2 comprises three chains or shielded wires 1, 5 and 16 arranged and connected to each other into a network of chains, which network includes two rows of diamond-shaped openings adjacent and parallel to one another. The two extremities 5-a and 5-b of the third chain 5 respectively extending from the two end-most junctions 8 and 11 between third and first chains 5 and 1 are connected to the two extremities of the second retainer chord 15, respectively, wherein the second retainer cord 15 linked to the third chain 5 at each zig-zag point 12, 13 and 14 in a sliding arrangement includes connecting means such as a hook 6 and eyelet 7 respectively included in the two extremities thereof for removably connecting the two extremities thereof to one another. The extremity 5-a of the third chain 5 is a first flexible elongated member and the extremity 5-b of the third chain 5 is a fourth flexible elongated member. The first chain 1 is connected to the third chain 5 at each zig-zag point 8, 9, 10 and 11. One extremity 1-a and 16-a of the first chain 1 (a second flexible elongated member) extending from one end-most junction 8 between the first and third chains 1 and 5 includes an angled link 3 at the mid-length thereof and a hook 4 at the end thereof. The other extremity 1-b of the first chain 1 extending from the other end-most junction 11 is connected to the extremity 16-b of the second chain 16, which extremity 1-b includes an angled link 2. The second chain 16 is connected to the first chain 1 at each zig-zag point 18, 19, and 20. The extremity 16-c of the second chain 16 (a third flexible elongated member) extending from one end-most junction 18 between the first and second chains 1 and 16 includes an eyelet 21. The first retainer cord 24 secured to one end-most zig-zag point 17 including an eyelet is linked to each zig-zag point 22 and 23 in a sliding arrangement and engages through the eyelet 21 secured to the extremity 16-c of the second chain 16, which first retainer cord 24 includes a hook 25 that is to engage the eyelet 17. The hook 4 is to engage the eyelet 21.

The continuous snow chain having the open-ended structure as shown in FIG. 2 can be easily and instantly installed on an automobile tire. After spreading the chain on the ground as shown in FIG. 2, one moves the automobile to a position where the drive wheel rests on the middle of the chain spread on the ground. After bringing the two ends of the chain together around the thread surface of the tire, one engages the two angled links 2 and 3 by looping the extremity 16-a through the diamond-shaped opening including the chain elements 1-b and 16-b and, then, connects the hook 4 to the eyelet 21. The installation is complete when one closes the two retainer cords 15 and 24 by connecting the hook 6 to eyelet 7 and the hook 25 to the eyelet 17. The snow chain is taken off by following the installation procedure in reverse order.

In FIG. 3 there is illustrated an embodiment of the continuous snow chain identical to that of FIG. 2 with one exception being that the eyelet 26 is now employed in place of the angled link 2 shown in FIG. 2. In installing the snow chain, the extremity 27 of the traction chain is threaded through the eyelet 2b in such a way that the angled link engages the eyelet.

Figure 4:
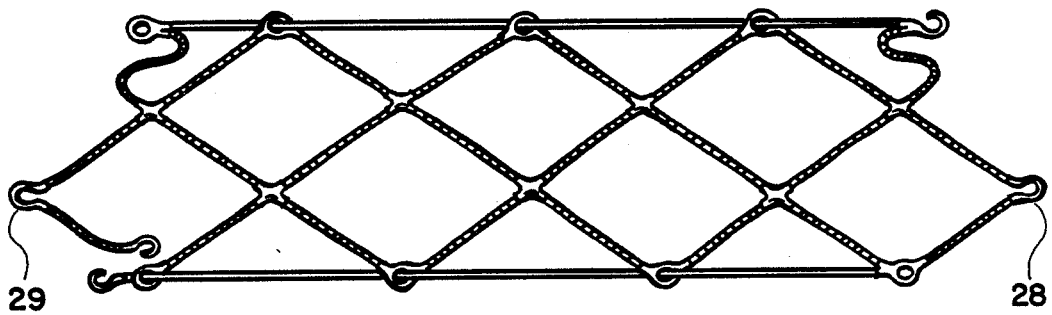
FIG. 4 illustrates an embodiment of the continuous snow chain employing the combination of a pair of open-links as means for closing the zig-zag traction cord.

In FIG. 4 there is illustrated an embodiment of the continuous snow chain having the same construction as that of FIG. 2 with one exception being that the open links 28 and 29 now replace the angled links 2 and 3 shown in FIG. 2.

Figure 5:
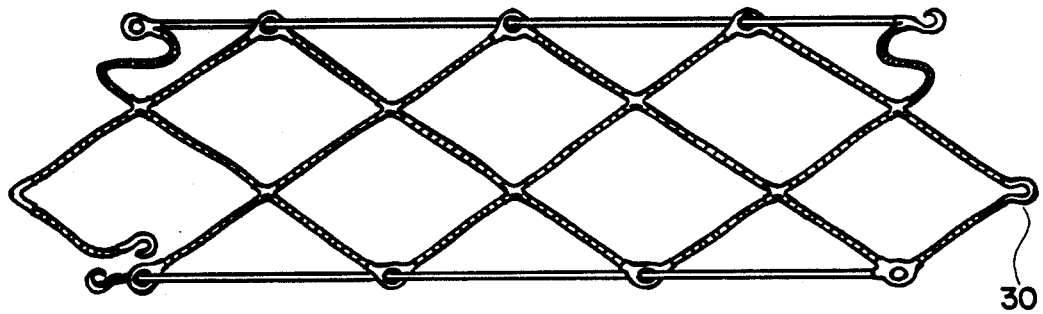
FIG. 5 illustrates an embodiment of the continuous snow chain employing the combination of an angled member and an open-link as means for closing the zig-zag traction cord.

In FIG. 5 there is illustrated an embodiment of the continuous snow chain having the same construction as that shown in FIG. 3 with one exception. The open-link 30 is now employed in place of the eyelet 26 shown in FIG. 3.

Figure 6:
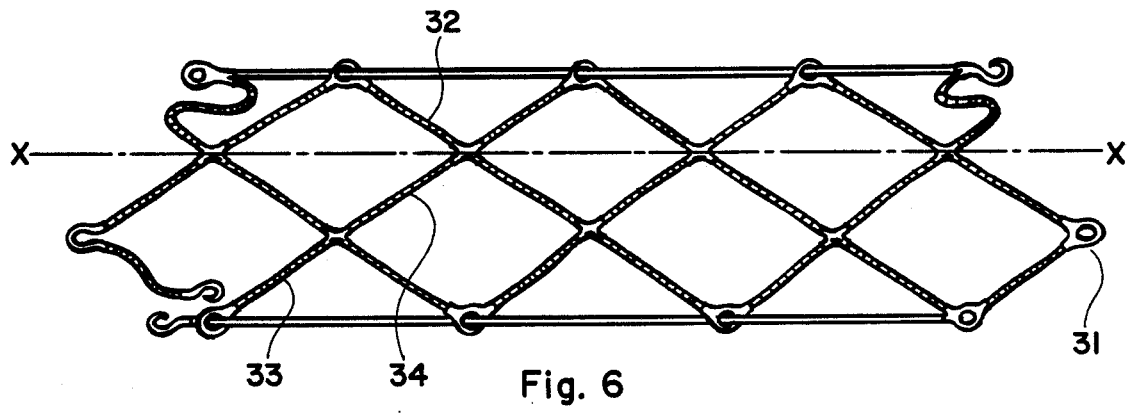
FIG. 6 illustrates an embodiment of the continuous snow chain employing the combination of an open-link and an eyelet as means for closing the zig-zag traction cord.

In FIG. 6 there is illustrated an embodiment of the continuous snow chain identical to that shown in FIG. 4 with one exception. The eyelet 31 is now employed in place of the open-link 28 shown in FIG. 4. It is readily recognized that a continuous snow chain comprising three rows of diamond shaped openings can be constructed by eliminating the chain 32 and, then, adding two chains in its place in a mirror image to the two chains 33 and 34 about plane x—x as shown in FIG. 6.

The snow chain comprising three rows of diamond shaped openings thereby constructed comprises:

(a) a network of flexible elongated elements including at least three rows of diamond-shaped openings disposed in side-by-side and parallel arrangement;

(b) a first retainer flexible elongated member connected to one edge of said network at each zig-zag point on said one edge; wherein said first retainer flexible elongated member includes means for removably connecting two extremities thereof to one another;

(c) a second retainer flexible elongated member connected to the other edge of said network opposite to said one edge at each zig-zag point on said the other edge; wherein said second retainer flexible elongated member includes means for removably connecting two extremities thereof to one another;

(d) a first and second flexible elongated members extending from one end-most junction of a middle row of said diamond-shaped openings, wherein each of said first and second flexible elongated members includes a first half of a coupling means disposed at a mid portion thereof and a first half of a connecting means disposed at the extremity thereof;

(e) a third flexible elongated member extending from one end-most junction of one side row of said diamond-shaped openings adjacent to said one-end most junction of the middle row of said diamond-shaped openings and connected to said first retainer flexible elongated member, said third flexible elongated member including a second half of said connecting means of said first flexible elongated member disposed at the extremity thereof;

(f) a fourth flexible elongated member extending from one end-most junction of another side row of said row of said diamond-shaped openings adjacent to said one end-most junction of the middle row of said diamond-shaped openings and connected to second retainer flexible elongated member, said fourth flexible elongated member including a second half of said connecting means of said second flexible elongated member disposed at the extremity thereof;

(g) a second half of said coupling means of said first flexible elongated member disposed at the other end-most junction of said one side row of said diamond-shaped openings opposite to said one end-most junction of said one side row; and (h) a second half of said coupling means of second flexible elongated member disposed at the other end-most junction of said another side row of said diamond-shaped openings opposite to said one end-most junction of said another side row; and (i) wherein at least one of said halves of said coupling means comprises at least an open-link member or an angle link member.

While the principles of the invention have now been made clear by the illustrative embodiments, there will be immediately obvious to those skilled in the art many modifications in the structures, arrangements, proportions, elements and materials which are particularly adapted to the specific working environments and operating conditions in the practice of the invention without departing from those principles. It is not desired to limit the invention to the particular illustrated embodiments shown and described and, accordingly, all suitable modifications and equivalents may be resorted to falling within the scope of the inventions as defined by the claims which follow.

The embodiments of the invention, in which an exclusive property or privilege is claimed, are defined as follows:

1. A continuous snow chain for automobile tires comprising in combination:
   (a) a network of flexible elongated elements including at least two rows of diamond-shaped openings disposed adjacent and parallel to one another;
   (b) a first retainer flexible elongated member connected to one edge of said network at each zig-zag point on said one edge; wherein said first retainer flexible elongated member includes means for removably connecting two extremities thereof to one another;
   (c) a second retainer flexible elongated member connected to the other edge of said network opposite to said one edge at each zig-zag point on said the other edge wherein said second retainer flexible elongated member includes means for removably connecting two extremities thereof to one another;
   (d) a first and second flexible elongated members extending from one end-most junction of the first row of said diamond-shaped openings, wherein the first flexible elongated member is connected to said second retainer flexible elongated member and the second flexible elongated member includes a first half of a coupling means disposed at a mid portion thereof and a first half of a connecting means disposed at the extremity thereof;
   (e) a third flexible elongated member extending from one end-most junction of the second row of said diamond-shaped openings adjacent to said one end-most junction of the first row of said diamond-shaped openings and connected to said first retainer flexible elongated member, said third flexible elongated member including a second half of said connecting means disposed at the extremity thereof;
   (f) a fourth flexible elongated member extending from the other end-most junction of the first row of said diamond-shaped openings opposite to said one end-most junction and connected to said second retainer flexible elongated member; and
   (g) a second half of said coupling means disposed at the other end-most junction of the second row of said diamond-shaped opening opposite to said one end-most junction of the second row and wherein the first or second half of said coupling means comprises at least an open-link member or an angle-link member.

2. The combination as set forth in claim 1 wherein said first retainer flexible elongated member is slidable relative to at least one of said zig-zag points connected thereto.

3. The combination as set forth in claim 2 wherein said second retainer flexible elongated member is slidable relative to at least one of said zig-zag points connected thereto.

4. The combination as set forth in claim 3 wherein the first and second halves of said coupling means respectively comprise two angled-link members for engaging each other in a retaining relationship.

5. The combination as set forth in claim 3 wherein the first and second halves of said coupling means respectively comprise two open-link members for engaging each other in a retaining relationship.

6. The combination as set forth in claim 3 wherein the first and second halves of said coupling means respectively comprise an angled-link member and an open-link member for engaging each other in a retaining relationship.

7. The combination as set forth in claim 3 wherein the first and second halves of said coupling means respectively comprise an open-link member and an angled-link member for engaging each other in a retaining relationship.

8. The combination as set forth in claim 3 wherein the first and second halves of said coupling means respectively comprise an angled link member and an eyelet member for engaging each other in a retaining relationship.

9. The combination as set forth in claim 3 wherein the first and second halves of said coupling means respectively comprise an open-link member and an eyelet member for engaging each other in a retaining relationship.

10. A continuous snow chain for automobile tires comprising in combination:
   (a) a network of flexible elongated elements including at least three rows of diamond-shaped openings disposed in side-by-side and parallel arrangement;
   (b) a first retainer flexible elongated member connected to one edge of said network at each zig-zag point on said one edge; wherein said first retainer flexible elongated member includes means for removably connecting two extremities thereof to one another;
   (c) a second retainer flexible elongated member connected to the other edge of said network opposite to said one edge at each zig-zag point on said the other edge; wherein said second retainer flexible elongated member includes means for removably connecting two extremities thereof to one another;
   (d) a first and second flexible elongated members extending from one end-most junction of a middle row of said diamond-shaped openings, wherein each of said first and second flexible elongated members includes a first half of a coupling means disposed at a mid portion thereof and a first half of a connecting means disposed at the extremity thereof;
   (e) a third flexible elongated member extending from one end-most junction of one side row of said diamond-shaped openings adjacent to said one-end most junction of the middle row of said diamond-shaped openings and connected to said first retainer flexible elongated member, said third flexible elongated member including a second half of said connecting means of said first flexible elongated member disposed at the extremity thereof;
   (f) a fourth flexible elongated member extending from one end-most junction of another side row of said diamond-shaped openings adjacent to said one end-most junction of the middle row of said diamond-shaped openings and connected to said second retainer flexible elongated member, said fourth flexible elongated member including a second half of said connecting means of said second flexible elongated member disposed at the extremity thereof;

(g) a second half of said coupling means of said first flexible elongated member disposed at the other end-most junction of said one side row of said diamond-shaped openings opposite to said one end-most junction of said one side row; and (h) a second half of said coupling means of said second flexible elongated member disposed at the other end-most junction of said another side row of said diamond-shaped openings opposite to said one end-most junction of said another side row; and (i) wherein at least one of said halves of said coupling means of said first or second flexible elongated members comprises at least an open-link member or an angle link member.

11. The combination as set forth in claim 10 wherein said first retainer flexible elongated member is slidable relative to at least one of said zig-zag points connected thereto.

12. The combination as set forth in claim 11 wherein said second retainer flexible elongated member is slidable relative to at least one of said zig-zag points connected thereto.

13. The combination as set forth in claim 12 wherein the first and second halves of said coupling means respectively comprise two angled-link members for engaging each other in a retaining relationship.

14. The combination as set forth in claim 12 wherein the first and second halves of said coupling means respectively comprise two open-link members for engaging each other in a retaining relationship.

15. The combination as set forth in claim 12 wherein the first and second halves of said coupling means respectively comprise an angled-link member and an open-link member for engaging each other in a retaining relationship.

16. The combination as set forth in claim 12 wherein the first and second halves of said coupling means respectively comprise an open-link member and an angled-link member for engaging each other in a retaining relationship.

17. The combination as set forth in claim 12 wherein the first and second halves of said coupling means respectively comprise an angled link member and an eyelet member for engaging each other in a retaining relationship.

18. The combination as set forth in claim 12 wherein the first and second halves of said coupling means respectively comprise an open-link member and an eyelet member for engaging each other in a retaining relationship.

* * * * *